(12) United States Patent
Wei et al.

(10) Patent No.: US 12,195,560 B2
(45) Date of Patent: Jan. 14, 2025

(54) SCALABLE PRODUCTION OF PROCESSABLE DRIED NANOMATERIALS AND SUPERHYDROPHOBIC SURFACES FROM CELLULOSE NANOMATERIALS

(71) Applicant: Purdue Research Foundation, West Lafayette, IN (US)

(72) Inventors: Alexander Wei, West Lafayette, IN (US); Tae Hoo Chang, West Lafayette, IN (US); Miran Mavlan, Northridge, CA (US)

(73) Assignee: Purdue Research Foundation, West Lafayette, IN (US)

( * ) Notice: Subject to any disclaimer, the term of this patent is extended or adjusted under 35 U.S.C. 154(b) by 617 days.

(21) Appl. No.: 17/610,584

(22) PCT Filed: May 15, 2020

(86) PCT No.: PCT/US2020/033062
§ 371 (c)(1),
(2) Date: Nov. 11, 2021

(87) PCT Pub. No.: WO2020/232335
PCT Pub. Date: Nov. 19, 2020

(65) Prior Publication Data
US 2022/0213228 A1   Jul. 7, 2022

Related U.S. Application Data (60) Provisional application No. 62/848,670, filed on May 16, 2019.

(51) Int. Cl.
*C08B 1/00* (2006.01)
*B82Y 30/00* (2011.01)
(Continued)

(52) U.S. Cl.
CPC ............... *C08B 1/003* (2013.01); *C08B 3/10* (2013.01); *C08B 15/005* (2013.01); *C08B 15/08* (2013.01);
(Continued)

(58) Field of Classification Search
CPC ......... C08B 1/003; C08B 3/10; C08B 15/005; C08B 15/08; C08B 15/10; C08B 1/00;
(Continued)

(56) References Cited

U.S. PATENT DOCUMENTS

2014/0130710 A1*  5/2014  Laukkanen ............ D21H 19/34
                                                              427/458
2015/0093560 A1    4/2015  Nemoto et al.
(Continued)

FOREIGN PATENT DOCUMENTS

CN   102964605 A  *  3/2013
CN   103132169 A  *  6/2013  ............. C08B 16/00
(Continued)

OTHER PUBLICATIONS

Zhang et al, "Mechanochemical preparation of surface-acetylated cellulose powder to enhance mechanical properties of cellulose-filler-reinforced NR vulcanizates," 2008, Composites Science and Technology 68, 2479-2484. (Year: 2008).*
(Continued)

*Primary Examiner* — Stefanie J Cohen
(74) *Attorney, Agent, or Firm* — Purdue Research Foundation (57) ABSTRACT

The present disclosure generally relates to a process for manufacturing a processable dried cellulose nanomaterial using a co-solvent of tert-butyl alcohol (TBA), of which unique physical/chemical properties enable facile modification/derivatization. This present disclosure also relates to materials and process of generating of superhydrophobic
(Continued)

surface coating using hydrophobic carboxylic acid modified cellulose nanofibers. Both the processes and the products thereof are within the scope of this disclosure.

6 Claims, 8 Drawing Sheets

(51) Int. Cl.
    *B82Y 40/00*     (2011.01)
    *C08B 3/10*     (2006.01)
    *C08B 15/00*     (2006.01)
    *C08B 15/08*     (2006.01)
    *C08J 3/09*     (2006.01)

(52) U.S. Cl.
    CPC .............. *C08J 3/091* (2013.01); *B82Y 30/00* (2013.01); *B82Y 40/00* (2013.01); *C08J 2301/10* (2013.01)

(58) Field of Classification Search
    CPC ....... C08J 3/091; C08J 2301/10; B82Y 30/00; B82Y 40/00; C08L 1/02; C08L 1/10
    See application file for complete search history.

(56) References Cited

U.S. PATENT DOCUMENTS

2018/0119334 A1*  5/2018  Netravali ................. C08B 15/05
2019/0112494 A1*  4/2019  Thalappil ............. C09D 5/1681

FOREIGN PATENT DOCUMENTS

| CN | 103333259 A | * 10/2013 | ............... C08B 3/12 |
| CN | 105153819 A | 12/2015 | |
| WO | 2018219638 A1 | 12/2018 | |

OTHER PUBLICATIONS

English language machine translation of CN 103333259 A, Lirong et al, Oct. 2, 2013. (Year: 2024).*
English language machine translation of CN 102964605 A, Chen et al, Mar. 13, 2013. (Year: 2024).*
English machine translation of CN 103132169 A, Huang et al, Jun. 5, 2013. (Year: 2024).*
Piras et al, "Ball milling: a green technology for the preparation and functionalization of nanocellulose derivatives," (Jan. 2019), Nanoscale Advances, 1, 937-947. (Year: 2019).*
Baidya, A. et al., "Organic Solvent-Free Fabrication of Durable and Multifunctional Superhydrophobic Paper from Waterborne Fluorinated Cellulose Nanofiber Building Blocks", ACS Nano, (11), (2017) pp. 11091-11099.
Cheng, Q-Y., et al., "Sustainable and Biodegradable Superhydrophobic Coating from Epoxidized Soybean Oil and ZnO Nanoparticles on Cellulosic Substrates for Efficient Oil/Water Separation", ACS Sustainable Chem. Eng., (5), (2017) pp. 11440-11450.
Guo, Z. et al., "Biomimic from the Superhydrophobic Plant Leaves in Nature: Binary Structure and Unitary Structure", Plant Science (172) (2007) pp. 1103-1112.
Lim, J-M. et al., "Superhydrophobic Films of Electrospun Fibers with Multiple-Scale Surface Morphology", Langmuir (23) (2007) pp. 7981-7989.
Liu, G. et al., "Robust and Self-Healing SuperhyDrophobic Cotton Fabric Via UV Induced Click Chemistry for Oil/Water Separation", Cellulos (2019) pp. 3529-3541.
Mavlan, M. et al., "Mechanochemical Esterification of Cellulose Nanofibers Lyophilized from Eutectic Water—Tert-Butanol Mixtures", Cellulos (2023) 13 pages.
Postek, M.T. et al., "Development of the Metrology and Imaging of Cellulose Nanocrystals", Meas. Sci. Technol. (22) (2011) pp. 1-11.
Shin, S. et al., "Bio-Inspired ExtremeWetting Surfaces for Biomedical Applications", Materials (9) (116) (2016) pp. 1-26.
Toma, M. et al., "Fabrication of Broadband Antireflective Plasmonic Gold Nanocone Arrays on Flexible Polymer Films", Nano Lett. (13) (2013) pp. 6164-6169.
International Search Report and Written Opinion for International Application No. PCT/US2020/033062, dated Sep. 16, 2020, 11 pages.

* cited by examiner

Wherein CN =

Unit: β linked D-glucose

SCALABLE PRODUCTION OF PROCESSABLE DRIED NANOMATERIALS AND SUPERHYDROPHOBIC SURFACES FROM CELLULOSE NANOMATERIALS

CROSS-REFERENCE TO RELATED APPLICATIONS

The present U.S. patent application is a national stage entry under 35 U.S.C. § 371(b) of International Application No. PCT/US20/33062, filed on May 15, 2020, which is relates to and claims the priority benefits of U.S. Provisional Application Ser. No. 62/848,670, filed May 16, 2019, the contents of which are hereby incorporated by reference in their entirety into this disclosure.

GOVERNMENT SUPPORT CLAUSE

This invention was made with government support under CMMI1449358 awarded by the National Science Foundation. The government has certain rights in the invention.

TECHNICAL FIELD

The present disclosure generally relates to a process for manufacturing a processable dried cellulose nanomaterial using a co-solvent of tert-butyl alcohol (TBA), of which unique physical/chemical properties enable facile modification/derivatization. This present disclosure also relates to materials and process of generating of superhydrophobic surface coating using hydrophobic carboxylic acid modified cellulose nanofibers. Both the processes and the products thereof are within the scope of this disclosure.

BACKGROUND AND SUMMARY OF INVENTION

This section introduces aspects that may help facilitate a better understanding of the disclosure. Accordingly, these statements are to be read in this light and are not to be understood as admissions about what is or is not prior art.

Superhydrophobic (SHP) materials offer great potential for designing self-cleaning and anti-fouling surfaces. A common problem with SHP surfaces is that they are mechanically fragile, which has limited their development for practical applications. Here, we introduce biomimetic SHP materials based on cellulose nanofibers (CNFs) grafted with fatty acids, which offer a sustainable alternative to engineered surfaces using expensive lithographic methods and toxic fluorinated chemicals. Our system bears a strong resemblance to the Ramie leaf, whose SHP properties are derived from its waxy, fibrous structure. CNFs are first freeze-dried from an aqueous slurry containing 10% tert-butyl alcohol (TBA), then derivatized with fatty acids using a solventless ball-milling process. Prepared CNFs can be cast into free-standing membranes or dispersed in less toxic organic solvents then sprayed onto substrates to yield SHP coatings. A remarkable feature of the oleyl-CNF coatings is their capacity to regenerate their SHP properties, by the removal of worn surfaces through exfoliation. Analysis of oleyl-CNFs by optical and electron microscopy reveals a hierarchical structure suggestive of a self-similar layered network. This architecture may be a key feature in SHP regeneration.

BRIEF DESCRIPTION OF THE DRAWINGS

The above and other objects, features, and advantages of the present invention will become more apparent when taken in conjunction with the following description and drawings, and wherein:

FIGS. 1A-1B show materials characterization of freeze-dried cellulose nanoparticles (CNs) prepared under different freeze-drying conditions.

FIGS. 4A-4C show dispersion stability tests of 0.5 wt % oleic acid-modified cellulose nanofibers (CNFs) in different solvents. Vials on the left were prepared from CNFs freeze-dried from water alone; vials on the right were prepared from CNFs freeze-dried from 10% TBA. FIG. 4B shows dispersion in DMF.

FIGS. 8A-8B demonstrate a green chemistry of ball milling mechanochemistry without any organic solvents.

FIGS. 9A-9B demonstrate durability tests for superhydrophobic surface of fatty acid modified cellulose nanofibers.

These and other features, aspects and advantages of the present invention will become better understood with reference to the following detailed description and claims.

DETAILED DESCRIPTION

While the concepts of the present disclosure are illustrated and described in detail in the description herein, results in the their description are to be considered as exemplary and not restrictive in character; it being understood that only the illustrative embodiments are shown and described and that all changes and modifications that come within the spirit of the disclosure are desired to be protected.

As used herein, the following terms and phrases shall have the meanings set forth below. Unless defined otherwise, all technical and scientific terms used herein have the same meaning as commonly understood to one of ordinary skill in the art.

In the present disclosure the term "about" can allow for a degree of variability in a value or range, for example, within 10%, within 5%, or within 1% of a stated value or of a stated limit of a range. In the present disclosure the term "substantially" can allow for a degree of variability in a value or range, for example, within 90%, within 95%, 99%, 99.5%, 99.9%, 99.99%, or at least about 99.999% or more of a stated value or of a stated limit of a range.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting. Further, information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In some illustrative embodiments, the present disclosure relates to a patentable process converting common cellulose nanomaterials (CNs), namely nanofibers and nanocrystals, into a patentable state of matter, which can be distinguished from common CN-based materials having related compositions according to several characteristic and quantifiable features.

In some illustrative embodiments, the present disclosure relates to a process that converts CNs derived from any number of natural sources (wood, fibrous plants, grasses, agricultural products and/or residues including bagasse, corn, cotton, hemp, flax, jute, ramie, rice, sisal, and wheat) or bioengineered sources (plants, algae, bacteria, and other microbes) into a dried (solid) state that can be redispersed and/or processed by various chemical or mechanical methods. The key quality of the dried CNs is the ease and efficiency with which they can be redispersed and processed, relative to CNs dried using other conditions. In some preferred embodiments, the dried CNs are prepared using a co-solvent freeze drying process. In some embodiments, the co-solvent comprises of water and tert-butyl alcohol (TBA). In some further preferred embodiments, the content of TBA ranges from about 2% to about 50% by volume or weight. Yet in some further preferred embodiments, the content of TBA ranges from about 5% to about 25% by volume or weight.

Figure 1A:
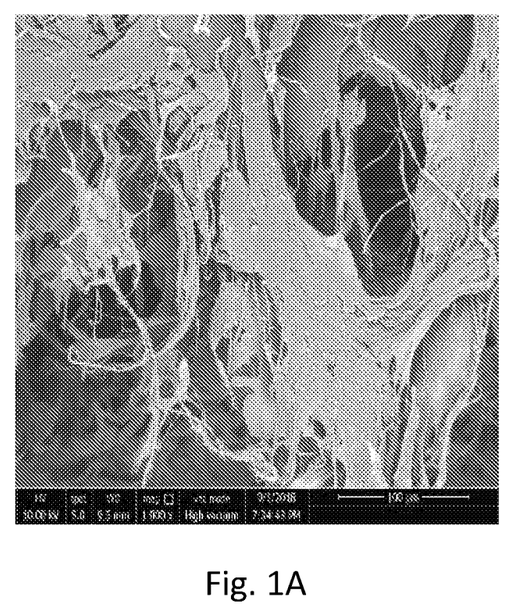
FIG. 1A shows scanning electron microscopy (SEM) image and surface area of CN fibers dried from water alone having a surface area of 2.44 $m^2/g$.
Figure 1B:
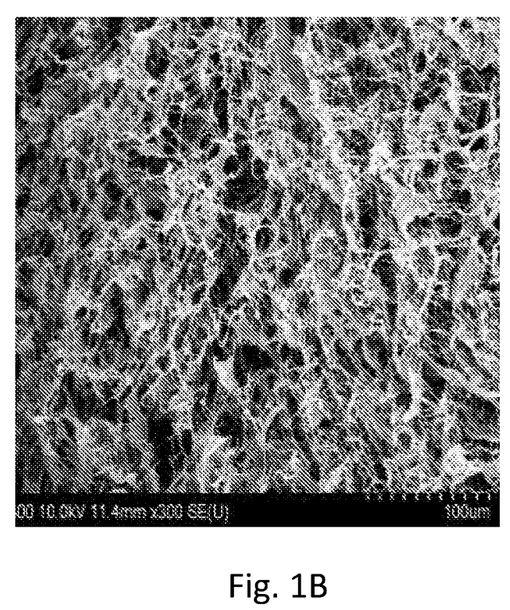
FIG. 1B shows SEM image and surface area of CN fibers dried from 10% TBA having a surface area of 23.5 $m^2/g$.

In some illustrative embodiments, the present disclosure relates to a dried CNs of this invention can be characterized by a definable range of porosity, fiber width distribution, surface area-to-volume ratio, 3D architecture, tear resistance under various forms of stress, redispersibility in various solvents, and reaction efficiency toward various chemical reagents (FIG. 1). These quantitative parameters are defined by CN processability, and vice versa. Said processability includes, but not limits to, chemical/physical modification and derivatization, as well as downstream processing and formulation.

The conversion of aqueous CN suspensions into dried CNs with the qualities above can be achieved by specific conditions for lyophilization or freeze-drying. The invention has been demonstrated specifically with the addition of 10% tert-butyl alcohol (TBA) by weight or volume to the aqueous slurry prior to freezing and lyophilization, to yield dried CNs with the desired characteristics (FIG. 1). CN slurries can be treated with other alcohols or volatile organics as co-sublimants to produce dried CNs in readily processable forms. Other ways to achieve dried CNs of similar processability include critical point drying using supercritical $CO_2$, or multi-stage dewatering process prior to lyophilization or supercritical drying. Again, the invention relies on the CN's specific structural and chemical state, which can be achieved by freeze-drying and variations thereof.

Figure 2:
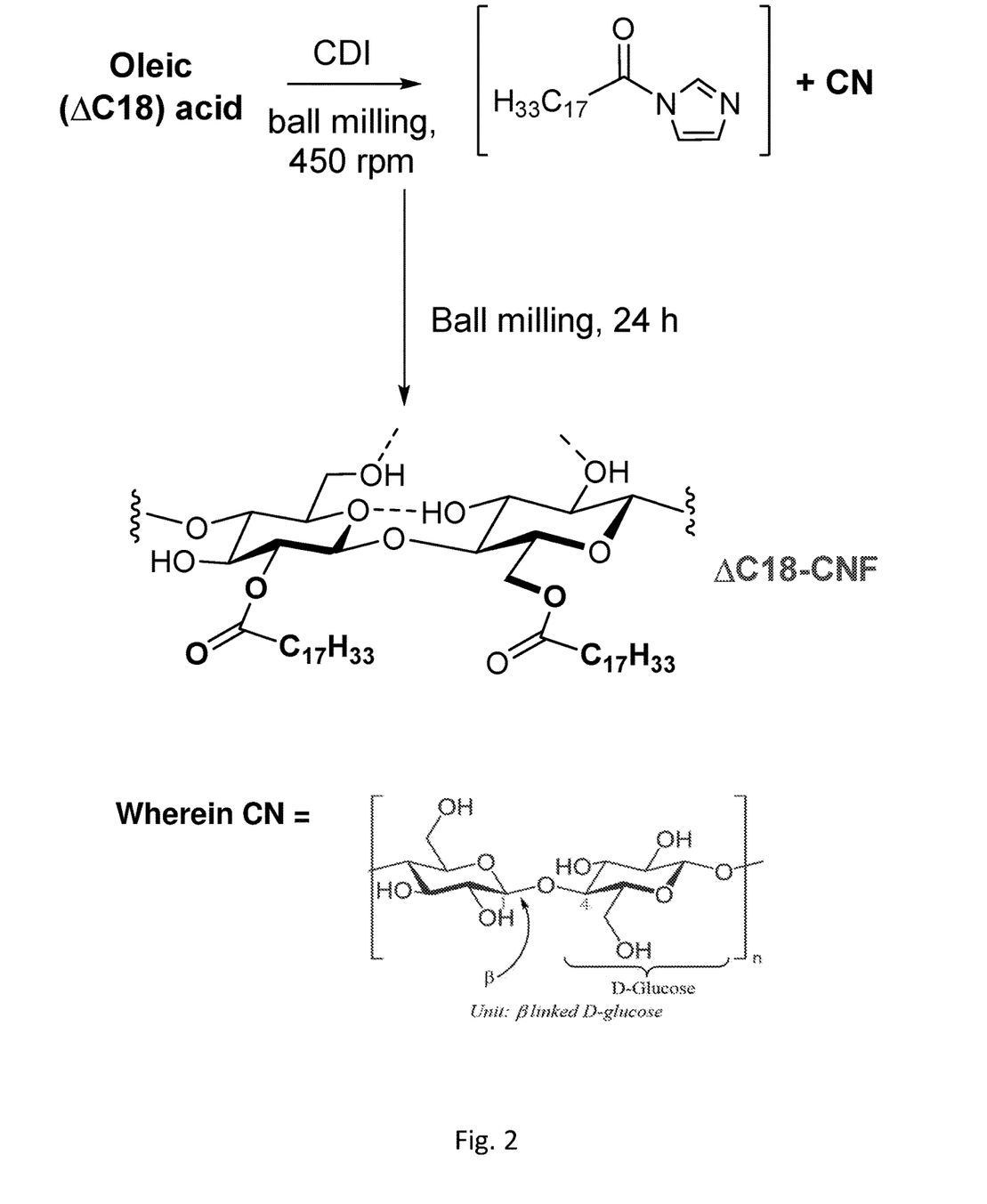
FIG. 2 shows an example of mechanochemical esterification of freeze dried cellulose nanomaterials.
Figure 3:
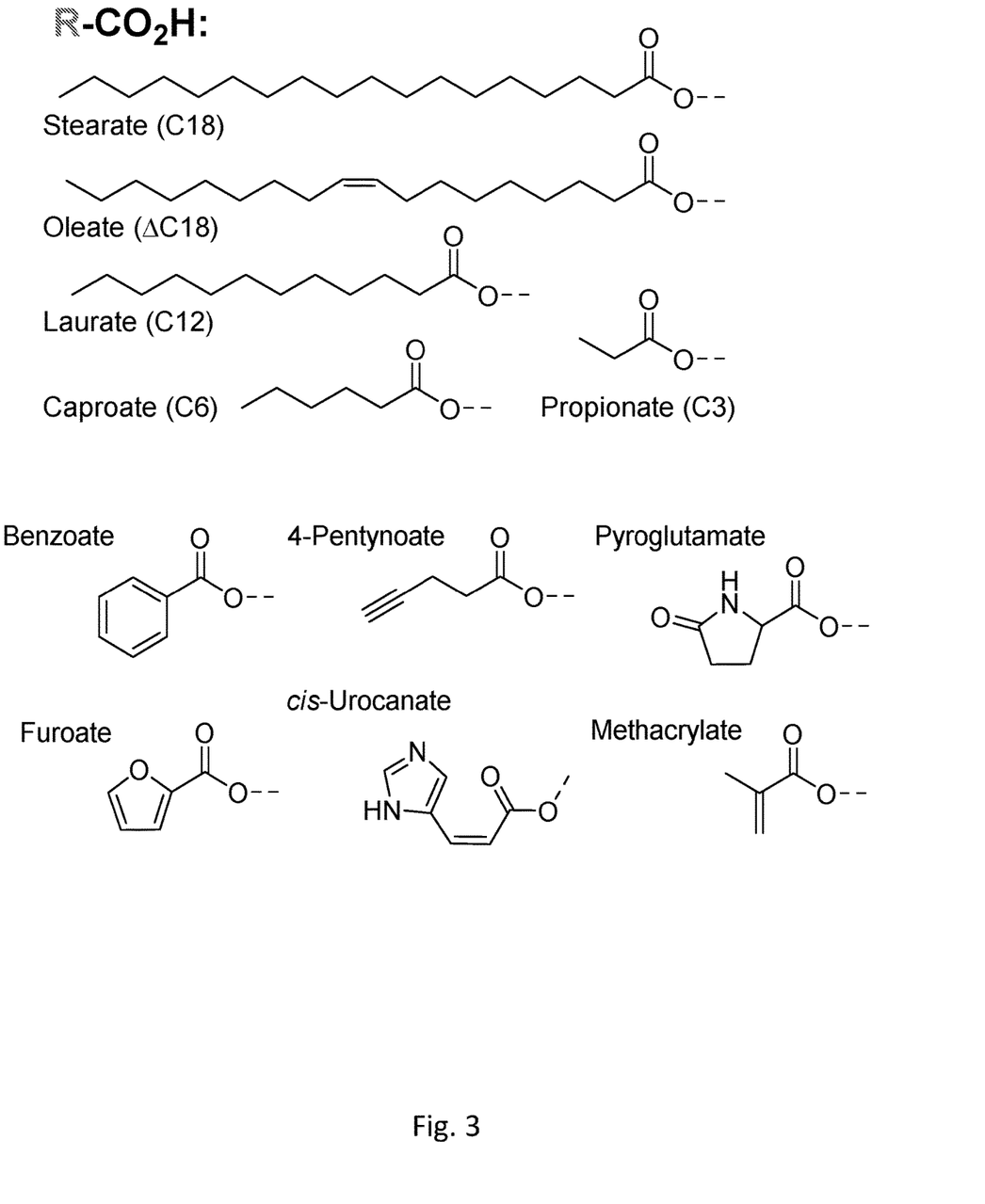
FIG. 3 shows the structures of examples of carboxylic acids (R—COOH) used in the esterification of cellulose nanomaterials.

In some other illustrative embodiments, the present disclosure relates to a process converting the dried CNs as disclosed herein further into chemically modified forms using mechanochemical methods without the addition of auxiliary solvents (FIG. 2). The invention has been exemplified specifically with esterification reactions using fatty acids and other carboxylic acids plus carbonyldiimidazole (CDI) as a coupling agent (FIG. 3), but can be extended to a broader range of acylation conditions and other reaction types such as etherification, acetalization, silylation, oxidation, additions to various electrophiles, or substitutions of various electrophiles.

Figure 4A:
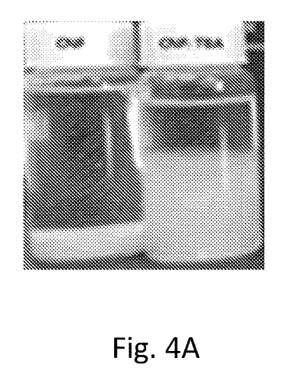
FIG. 4A shows dispersion in ethanol.
Figure 4B:
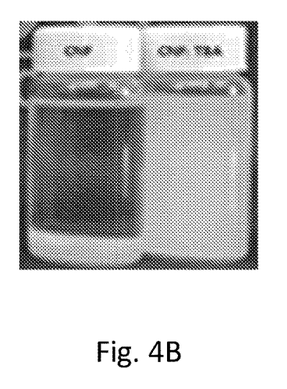
Figure 4C:
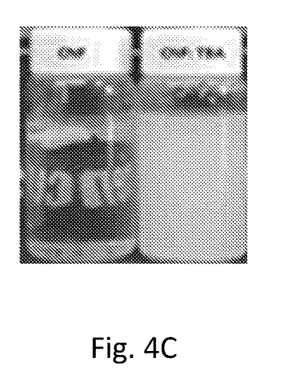
FIG. 4C shows dispersion in chloroform ($CHCl_3$).

In some other illustrative embodiments, the present disclosure relates to the chemical modified CNs of this invention can be characterized quantitatively by their dispersion stability in various solvents and processability with other organic media (FIG. 4). Chemically modified CNs in their dried (solid) state can be further characterized by a range of porosity, fiber width distribution, surface area-to-volume ratio, 3D architecture, tear resistance under various forms of stress, and other chemical or physical properties (e.g., superhydrophobicity). These quantitative parameters are dependent on the qualities of the dried CNs prior to chemical modification, and can be used to distinguish CN-based products of this invention from materials having similar compositions but prepared by alternate methods.

Figure 7:
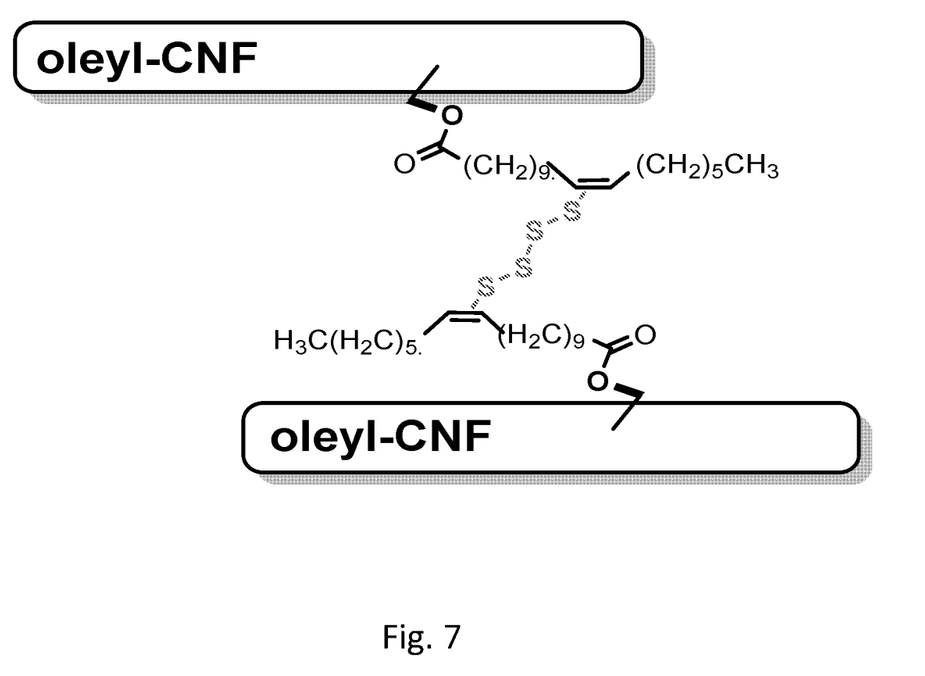
FIG. 7 shows chemically crosslinked CN network for increased mechanical toughness with retention of super-hydrophobic (SHP) properties.
Figure 8A:
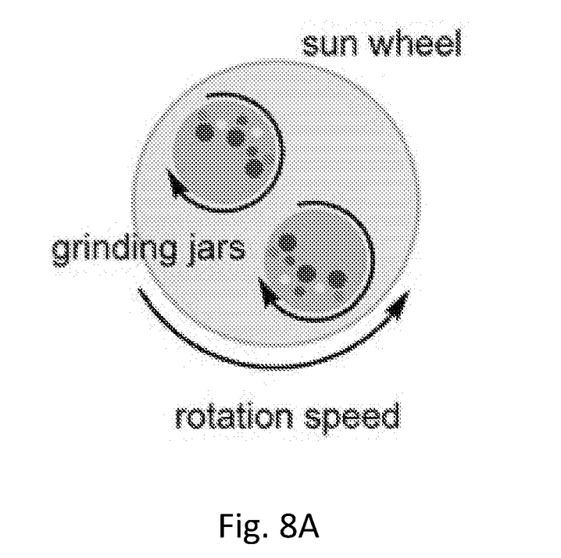
FIG. 8A shows schematics of milling balls.
Figure 8B:
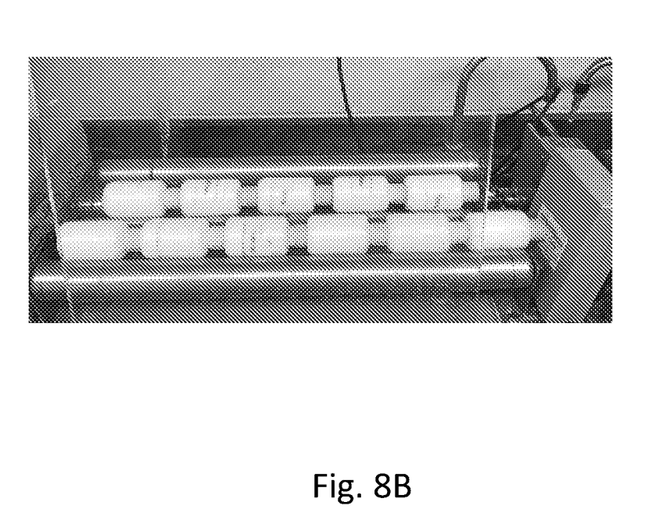
FIG. 8B shows an overview of ball milling instrument.
Figure 9A:
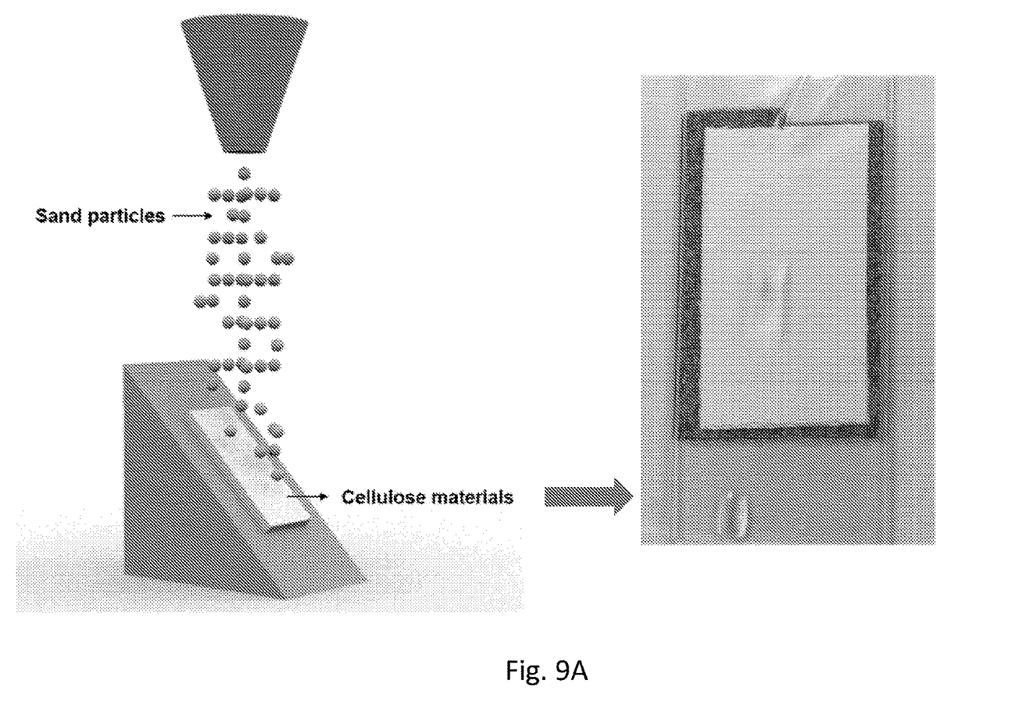
FIG. 9A is a demonstration of drop sand damages.
Figure 9B:
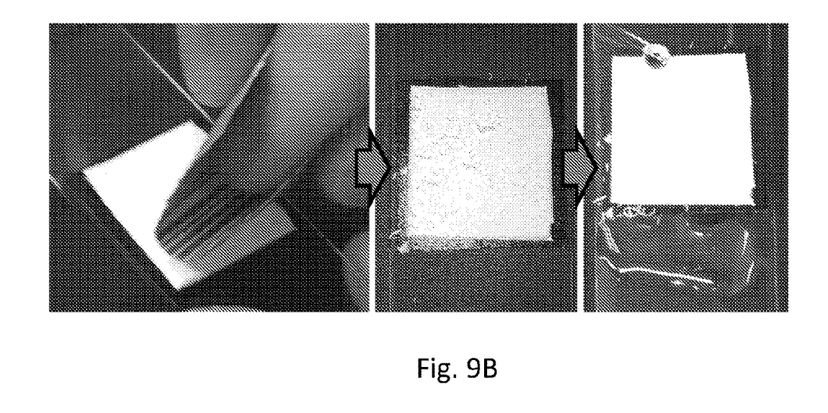
FIG. 9B shows a sand paper scratch test and surface property restoration.

In some other illustrative embodiments, the present disclosure relates to a process that further derivatizing the dried CNs as disclosed herein with functional groups that can support secondary chemical reactions such as conjugation, crosslinking, and polymerization (See FIG. 7). These reactions extend the usefulness of the initial chemical modification, and can be performed in the solid state, in solution, or at a biphasic (solid-gas or liquid-gas) interface.

Figure 5:
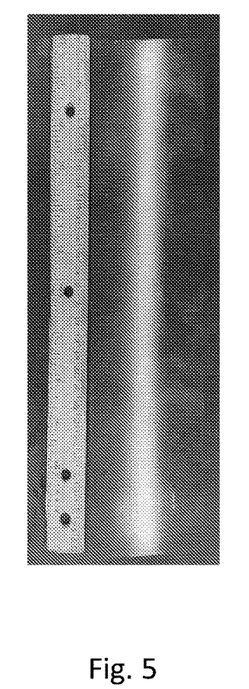
FIG. 5 shows dispersion of oleic acid-modified CNFs deposited onto thermoplastic roll film by spray coating.

Chemically modified CNs produced by this invention are miscible with a variety of organic media, including solvents, oils, and polymers. They can form stable dispersions or compounded into viscous blends that can be cast or deposited by a variety of processing methods including spray coating (FIG. 5), electrospray and electrospinning, slot-die coating, gravure coating, inkjet printing, screen printing and 3D printing.

Figure 6A:
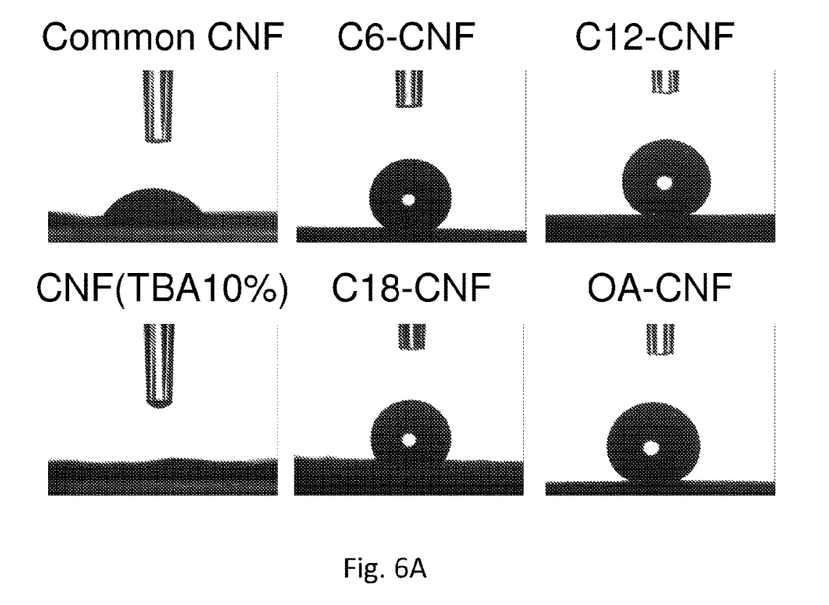
FIG. 6A shows water droplet resting on oleic acid-modified CN (OA-CN) coating, with contact angle of 160°.
Figure 6B:
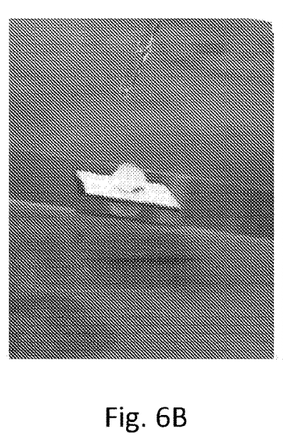
FIG. 6B shows water droplet resting on incline with fouled CN coating.
Figure 6C:
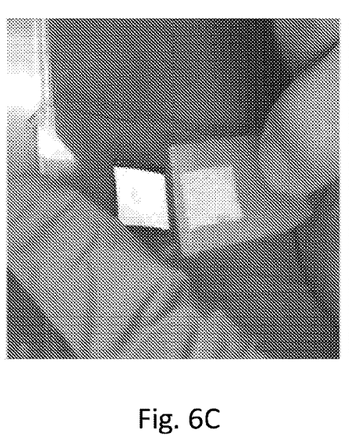
FIG. 6C shows exfoliation of top layer.
Figure 6D:
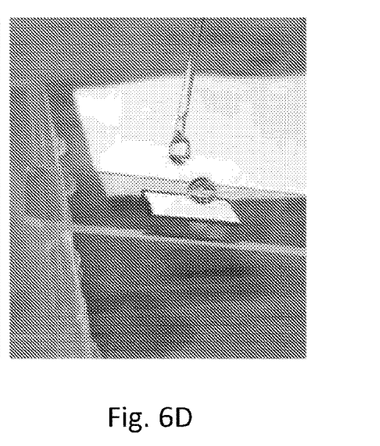
FIG. 6D shows restoration of super-hydrophobic (SHP) properties.

CNs modified with hydrophobic groups such as fatty acids (C6-C18 acids) can be cast into coatings with superhydrophobic (SHP) properties (FIG. 6A). Superhydrophobic is defined by contact-angle (CA) goniometry, in which a sessile drop of water forms an apparent CA of 150° or more between the liquid-solid and liquid-air interface, and has a CA hysteresis of 10° or less as measured by the tilt angle for droplet roll-off. The coatings prepared by this invention have two important qualities that give them a strong advantage over other types of SHP surfaces in practical applications. First, the SHP properties of the fatty-acid modified CN coatings are remarkably resilient against moderate levels of abrasion and wear, while most SHP surfaces are mechanically fragile. For example, SHP properties are retained even after abrading a CN-coated substrate with 150-grit sandpaper. Second, the CN coatings that are damaged or chemically fouled can renew their SHP properties simply by exfoliating the top layer (FIGS. 6B-6D). This regeneration can be repeated many times with incremental changes in coating thickness.

The mechanical toughness of the SHP-CN coatings can be further strengthened by chemical crosslinking to increase the cohesive strength between cellulose fibers, and by increasing elastic moduli ($E_m$) and fracture points in response to stress applied in specific directions. For CNs modified with unsaturated fatty acids, fibers can be crosslinked or vulcanized using elemental sulfur or bifunctional linkers, in combination with initiators or accelerators that can provide control over crosslinking rate and density, or by photoactivation (FIG. 7).

The hydrophobic CN coatings self-organize into a hierarchical, porous architecture that contributes toward its ability to retain its SHP properties against abrasive wear, and to regenerate SHP with exfoliation. This architecture naturally supports a re-entrant texture that discourages the penetration or adhesion of water droplets, and can be confirmed by structural characterizations as described above.

In some illustrative embodiments, the present disclosure relates to a process for manufacturing a processable dried cellulose nanomaterial comprising the steps of
a. obtaining common cellulose nanomaterial;
b. dispensing said common cellulose nanomaterial in a co-solvent to afford an aqueous suspension; and
c. freeze drying said aqueous suspension to afford said processable dried cellulose nanomaterial.

In some illustrative embodiments, the present disclosure relates to a process for manufacturing a processable dried cellulose nanomaterial as disclosed herein, wherein said co-solvent comprises water and a volatile organic solvent.

In some illustrative embodiments, the present disclosure relates to a process for manufacturing a processable dried cellulose nanomaterial as disclosed herein, wherein said volatile organic solvent is an alcohol.

In some illustrative embodiments, the present disclosure relates to a process for manufacturing a processable dried cellulose nanomaterial as disclosed herein, wherein said alcohol is tert-butyl alcohol (TBA).

In some illustrative embodiments, the present disclosure relates to a process for manufacturing a processable dried cellulose nanomaterial as disclosed herein, wherein said TBA ranges from about 2% to about 50% by volume or by weight.

In some illustrative embodiments, the present disclosure relates to a process for manufacturing a processable dried cellulose nanomaterial as disclosed herein, wherein said volatile organic solvent and water may be premixed or added to said common cellulose nanomaterial sequentially.

In some illustrative embodiments, the present disclosure relates to a process for manufacturing a processable dried cellulose nanomaterial as disclosed herein, wherein said co-solvent is a supercritical carbon dioxide.

In some illustrative embodiments, the present disclosure relates to a process for manufacturing a processable dried cellulose nanomaterial as disclosed herein, wherein said processable dried cellulose nanomaterial has a substantially increased surface area per unit of weight.

In some illustrative embodiments, the present disclosure relates to a process for manufacturing a processable dried cellulose nanomaterial as disclosed herein, wherein said processable dried cellulose nanomaterial can be facilely physically processed and/or chemically modified by solvent-free mechanochemistry.

In some illustrative embodiments, the present disclosure relates to a process for manufacturing a processable dried cellulose nanomaterial as disclosed herein, wherein said common cellulose nanomaterial is from a natural resource, e.g. wood, fibrous plants, grasses, agricultural products, residues of bagasse, cotton, hemp, flax, jute, ramie, rice, sisal and wheat, or a bioengineered source, e.g. plants, algae, bacteria, or other microbes.

In some illustrative embodiments, the present disclosure relates to a processable dried cellulose nanomaterial (CN) manufactured according to the process as disclosed herein.

In some illustrative embodiments, the present disclosure relates to a processable dried cellulose nanomaterial (CN) manufactured according to the process as disclosed herein, wherein said processable dried cellulose nanomaterial has a substantially increased surface area per unit of weight.

In some illustrative embodiments, the present disclosure relates to a process for manufacturing a superhydrophobic nanomaterial comprising the steps of
a. preparing a processable dried cellulose nanomaterial;
b. adding a hydrophobic agent and an activating agent; and
c. effecting a coupling reaction between said hydrophobic agent and said processable dried cellulose nanomaterial by dry milling to afford said superhydrophobic nanomaterial.

In some illustrative embodiments, the present disclosure relates to a process for manufacturing a superhydrophobic nanomaterial by a coupling reaction as disclosed herein, wherein said process comprising a step of modification/derivatisation of said superhydrophobic nanomaterial.

In some illustrative embodiments, the present disclosure relates to a process for manufacturing a superhydrophobic nanomaterial by a coupling reaction as disclosed herein, wherein said coupling reaction is a conjugation, crosslinking or polymerization.

In some illustrative embodiments, the present disclosure relates to a process for manufacturing a superhydrophobic nanomaterial by a coupling reaction as disclosed herein, wherein said coupling reaction is an esterification, etherification, acetalization, silylation, oxidation, nucleophilic or electrophilic substitution between said hydrophobic agent and said processable dried cellulose nanomaterial.

In some illustrative embodiments, the present disclosure relates to a process for manufacturing a superhydrophobic nanomaterial by a coupling reaction as disclosed herein, wherein said coupling reaction is an esterification between a fatty acid and said processable dried cellulose nanomaterial.

In some illustrative embodiments, the present disclosure relates to a process for manufacturing a superhydrophobic nanomaterial by a coupling reaction as disclosed herein, wherein said coupling reaction is without addition of an auxiliary solvent.

In some illustrative embodiments, the present disclosure relates to a process for manufacturing a superhydrophobic nanomaterial by a coupling reaction as disclosed herein, wherein said superhydrophobic nanomaterial is a coupling product between a hydrophobic fatty acid and said processable dried cellulose nanomaterial.

In some illustrative embodiments, the present disclosure relates to a process for manufacturing a superhydrophobic nanomaterial by a coupling reaction as disclosed herein, wherein said superhydrophobic nanomaterial is able to form a stable dispersion or compounded into a viscous blend that can be cast or deposited by a processing method comprising spray coating, electrospray, electro spinning, slot-die coating, gravure coating, inkjet printing, screen printing or 3D printing.

In some illustrative embodiments, the present disclosure relates to a superhydrophobic nanomaterial by a coupling reaction as disclosed herein.

In some illustrative embodiments, the present disclosure relates to a superhydrophobic nanomaterial by a coupling reaction as disclosed herein, wherein said superhydrophobic nanomaterial may be further derivatized with a functional group.

Superhydrophobic (SHP) materials offer great potential for designing self-cleaning and anti-fouling surfaces. A common problem with SHP surfaces is that they are mechanically fragile, which has limited their development for practical applications. Here, we introduce biomimetic SHP materials based on cellulose nanofibers (CNFs) grafted with fatty acids, which offer a sustainable alternative to engineered surfaces using expensive lithographic methods and toxic fluorinated chemicals. Our system bears a strong resemblance to the Ramie leaf, whose SHP properties are derived from its waxy, fibrous structure. CNFs are first freeze-dried from an aqueous slurry containing 10% tert-butyl alcohol (TBA), then derivatized with fatty acids using a solventless ball-milling process. Prepared CNFs can be cast into free-standing membranes or dispersed in less toxic organic solvents then sprayed onto substrates to yield SHP coatings. A remarkable feature of the oleyl-CNF coatings is their capacity to regenerate their SHP properties, by the removal of worn surfaces through exfoliation. Analysis of oleyl-CNFs by optical and electron microscopy reveals a hierarchical structure suggestive of a self-similar layered network. This architecture may be a key feature in SHP regeneration.

As the world's most abundant biomaterial, cellulose is composed of chains of repeating units comprising anhydroglucose rings of $(C_6H_{10}O_5)n$, where parallel stacking of cellulose chains form elementary nanofibrils with disordered & crystalline regions. Some CNFs can be prepared from delignified cellulose pulp by treatment with moderate acid, a milder conditions than that used for CNCs.

In Nature, there are many hydrophobic surfaces, including a particle-like Hierarchical structure and a fibrous Hierarchical structure.

A particle-like Hierarchical structure+epicuticular wax has a minimize contact area, as what is used in a high-energy etching/complex lithography; and the product is mechanically fragile. On the other hand, a fibrous Hierarchical structure+epicuticular wax has a uniform surface, which resemble electrospinning/toxic chemical treatment. The product is mechanically strong. Our innovations in this field are inspired by Nature.

CNFs can be chemically modified in the solid state, but one challenge is their relatively poor redispersion in organic media. We have found this is due to the hornification of CNFs during lyophilization. We solved this problem by adding tBuOH as a co-solvent to aqueous CNF slurries, which resulted in finely dispersed fibers after lyophilization (FIG. 1, Table 1).

Green Chemistry: We successfully achieved the functionalization of CNF surfaces with hydrophobic fatty acids by mechanochemistry without any organic solvents. Lyophilized CNFs derived from wood pulp are combined with solid carbonyldiimidazole (CDI), and subjected to horizontal ball milling system using Zr media. Green chemistry is also used in the purification of esterified CNFs; residual impurities were extracted with aqueous ethanol, a biorenewable solvent (FIG. 2)

TABLE 1

Surface area of freeze dried products at different concentration of TBA with BET measurement

| TBA (%) | Surface Area $(m^2/g)$ |
|---|---|
| 0 | 2.44 ± 0.03 |
| 10 | 23.47 ± 0.17 |
| 20 | 23.83 ± 0.17 |
| 30 | 20.47 ± 0.15 |
| 40 | 22.08 ± 0.14 |
| 50 | 19.57 ± 0.12 |

Material Characterization

Spray coating a surface, its self-cleaning characteristics and durability tests (see FIGS. 5, 6A-6D, and 9A-9B). OA-CNF coatings show good water repellency and self-cleaning properties. SHP character is retained after moderate mechanical abrasion or compression. OA-CNF surfaces can be regenerated by exfoliation. We attribute this feature to its 3D self-similar architecture.

Contact Angle Measurements (see FIG. 6A and Table 2)

Sessile-drop goniometry is used to quantify contact angles. C6-, C12-, and OA-modified CNFs exhibit CA>150°, indicating SHP. SEM analysis show well-dispersed nanofibers, except for C18-CNFs (mostly bundled as microfibers). Esterified CNFs exhibit a hierarchical (self-similar) architecture and porosity. These structures are retained even after mechanical compression or exfoliation.

TABLE 2

Surface water contact angle measurements

| Materials | $\theta_{adv}$ | $\theta_{static}$ | $\theta_{rec}$ |
|---|---|---|---|
| C6-CNF | 159.0 ± 2.3 | 157.2 ± 2.0 | 155.9 ± 3.4 |
| C12-CNF | 156.6 ± 2.2 | 157.6 ± 0.4 | 148.4 ± 4.7 |
| C18-CNF | 141.9 ± 4.1 | 130.7 ± 4.8 | 109.3 ± 8.4 |
| OA-CNF | 160.2 ± 2.2 | 159.9 ± 2.3 | 153.7 ± 1.5 |

Those skilled in the art will recognize that numerous modifications can be made to the specific implementations described above. The implementations should not be limited to the particular limitations described. Other implementations may be possible. While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected. It is intended that that the scope of the present methods and compositions be defined by the following claims. However, it must be understood that this disclosure may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims.

REFERENCES CITED

1. Guo, Z, et al., *Plant Sci.* 2007, 172, 1103-1112.
2. Postek, M. T.; Vladar, A.; Dagata, J.; et al. *Meas. Sci. Technol.* 2011, 22, 024005.

3. Shin, S.; Seo, J.; Han, H.; Kang, S.; Kim, H.; Lee, T. *Materials* 2016, 9, 116.
4. Toma, M.; Loget, G.; Corn, R. M. *Nano Lett.* 2013, 13, 6164-6169.
5. Lim, J. M.; Yi, G. R.; Moon, J. H.; Heo, C. J.; Yang, S. M. *Langmuir* 2007, 23, 7981-7989.

We claim:

1. A process for manufacturing a superhydrophobic nanomaterial comprising the steps of
   a. preparing a processable dried cellulose nanomaterial; wherein said processable dried cellulose nanomaterial can be facilely physically processed and/or chemically modified by solvent-free mechanochemistry;
   b. adding a hydrophobic agent and an activating agent; and
   c. effecting a coupling reaction between said hydrophobic agent and said processable dried cellulose nanomaterial by dry milling to afford said superhydrophobic nanomaterial.

2. The process for manufacturing a superhydrophobic nanomaterial according to claim 1 further comprising a step of derivatization of said superhydrophobic nanomaterial.

3. The process for manufacturing a superhydrophobic nanomaterial according to claim 1, wherein said coupling reaction is a conjugation, crosslinking or polymerization reaction.

4. The process for manufacturing a superhydrophobic nanomaterial according to claim 1, wherein said coupling reaction is an esterification, etherification, acetalization, sialylation, oxidation, nucleophilic or electrophilic substitution between said hydrophobic agent and said processable dried cellulose nanomaterial.

5. The process for manufacturing a superhydrophobic nanomaterial according to claim 4, wherein said coupling reaction is an esterification between a hydrophobic carboxylic acid and said processable dried cellulose nanomaterial.

6. The process for manufacturing a superhydrophobic nanomaterial according to claim 1, wherein said coupling reaction is without addition of an auxiliary solvent.

* * * * *